United States Patent [19]

Brustad et al.

[11] Patent Number: 5,051,226
[45] Date of Patent: Sep. 24, 1991

[54] METHOD OF CURING COMPOSITE PARTS

[75] Inventors: Val G. Brustad; Richard V. Phillips, both of Enumclaw; William L. Rodman, Kirkland, all of Wash.

[73] Assignee: The Boeing Company, Seattle, Wash.

[21] Appl. No.: 408,888

[22] Filed: Sep. 18, 1989

[51] Int. Cl.[5] ............... B29C 43/10; B29C 43/12; B29C 43/20

[52] U.S. Cl. ................ 264/511; 264/522; 264/546; 264/552; 264/553; 264/570; 264/573; 264/236; 264/257; 264/258; 264/313; 264/322; 264/324; 264/327; 264/347; 425/405.1

[58] Field of Search ............ 264/257, 258, 510, 511, 264/512, 102, 519, 522, 544, 546, 552, 553, 570, 572, 573, 236, 313, 319, 322, 324, 327, 347; 425/405.1, 405.2

[56] References Cited

U.S. PATENT DOCUMENTS

| | | | |
|---|---|---|---|
| 1,610,954 | 12/1926 | Lamplough | 264/174 |
| 2,176,153 | 10/1939 | Semon | 264/175 |
| 2,333,143 | 11/1943 | Bennett | 264/26 |
| 2,370,956 | 3/1945 | Harkom | 264/320 |
| 2,563,394 | 8/1951 | Cadgene | 264/342 |
| 2,838,800 | 6/1958 | Hertz | 264/570 |
| 2,964,852 | 12/1960 | Doleman et al. | 264/DIG. 51 |
| 2,971,242 | 2/1961 | Doleman et al. | 264/DIG. 51 |
| 3,072,968 | 1/1963 | Watson et al. | 264/347 |
| 3,794,705 | 2/1974 | Harley | 264/37 |
| 4,023,966 | 5/1977 | Loersch | 425/405.2 |
| 4,068,704 | 1/1978 | Wittmoser | 425/405.2 |
| 4,155,476 | 5/1979 | Lipiec | 425/405.2 |
| 4,212,621 | 7/1980 | Michelotti | 425/405.2 |
| 4,264,556 | 4/1981 | Kumar | 425/405.2 |
| 4,704,240 | 11/1987 | Reavely | 264/257 |
| 4,755,341 | 7/1988 | Reavely | 264/512 |
| 4,770,835 | 9/1988 | Kromrey | 264/257 |
| 4,778,643 | 10/1988 | Long | 264/510 |
| 4,812,115 | 3/1989 | Kemp | 425/405.2 |
| 4,883,632 | 11/1989 | Goto | 264/512 |

FOREIGN PATENT DOCUMENTS

| | | |
|---|---|---|
| 38035 | 7/1909 | Austria . |
| 753505 | 2/1962 | Canada . |
| 605820 | 7/1948 | United Kingdom . |

Primary Examiner—Jay H. Woo
Assistant Examiner—Jeremiah F. Durkin II
Attorney, Agent, or Firm—Glenn D. Bellamy

[57] ABSTRACT

A method for curing fiber-reinforced resin matrix composite materials (22) includes the steps of providing a form (14) and positioning uncured composite material (22) on the form (14) substantially into a desired shape. The composite material (22) is then cured by providing a fluid bath (10) heated to a predetermined temperature, and heating the composite material (22) by immersing the positioned composite material (22) on the form (14) into the fluid bath (10) for a predetermined time. The predetermined time is sufficient to allow the composite material (22) to become cured and to heat the composite material (22) at a rate sufficient to provide resin flow prior to hardening. Compressive pressure is provided on the composite material (22) while it is immersed in the fluid bath (10).

25 Claims, 4 Drawing Sheets

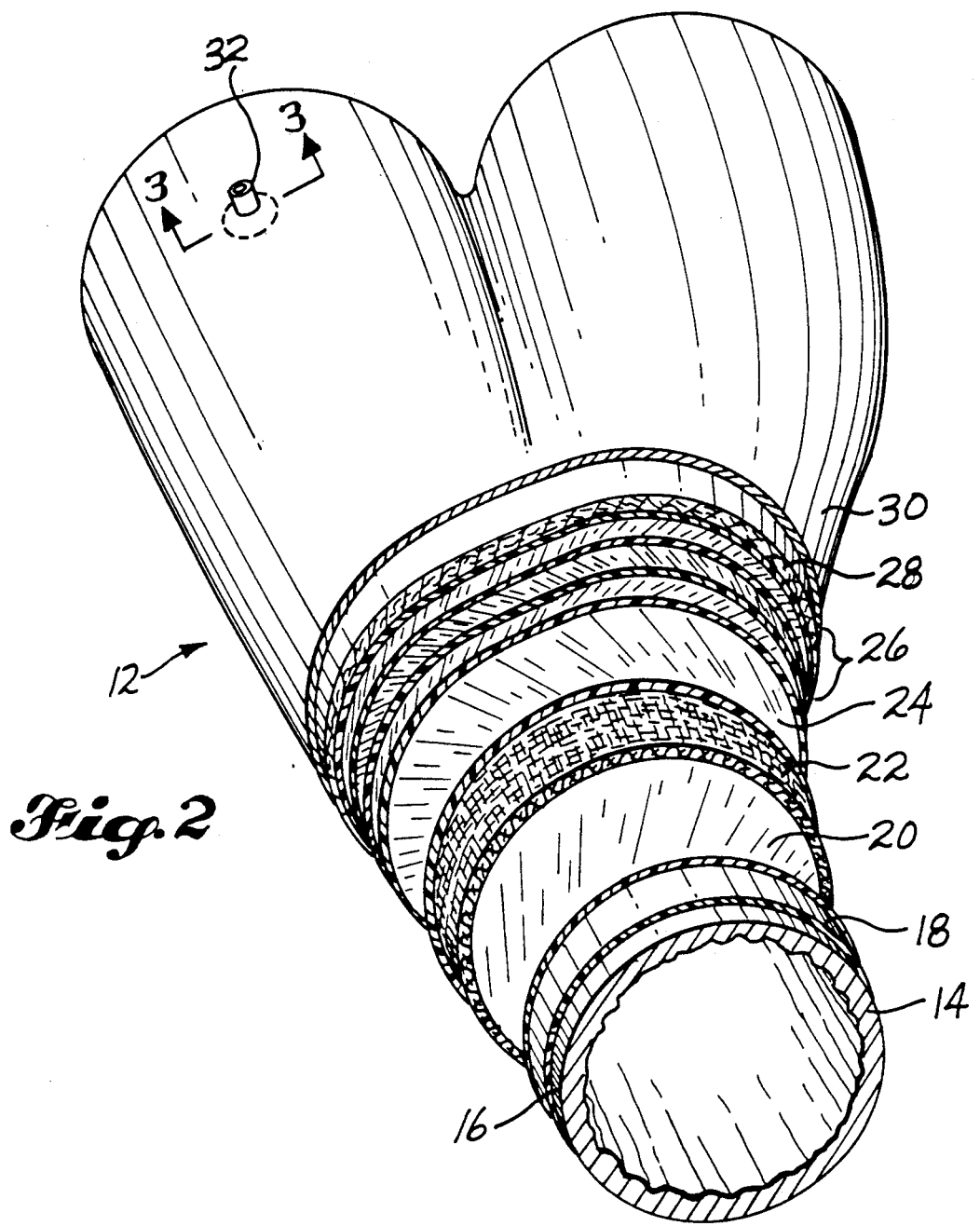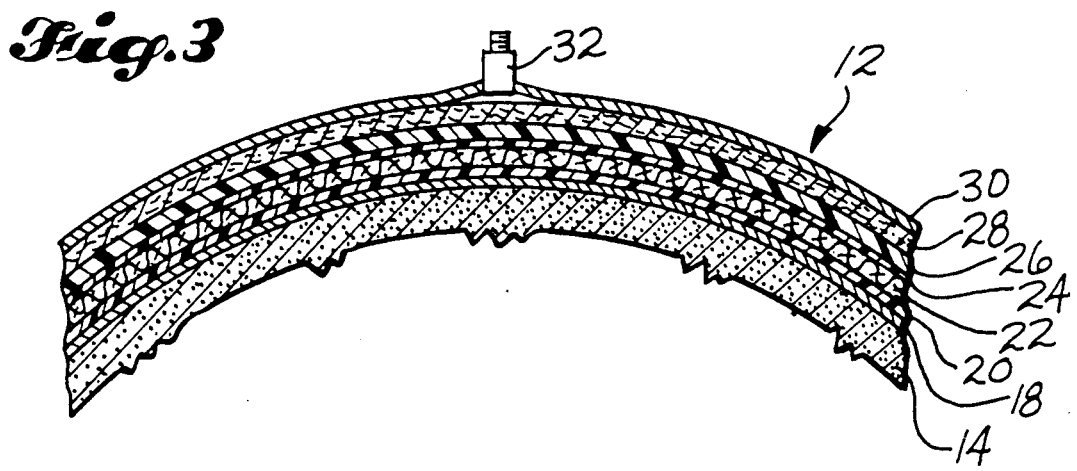

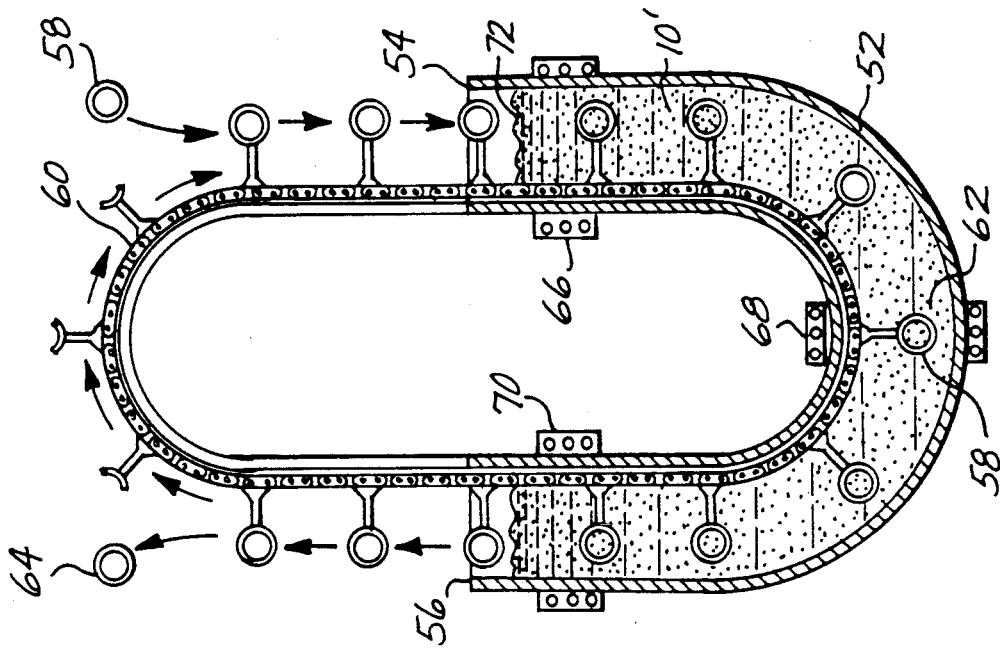
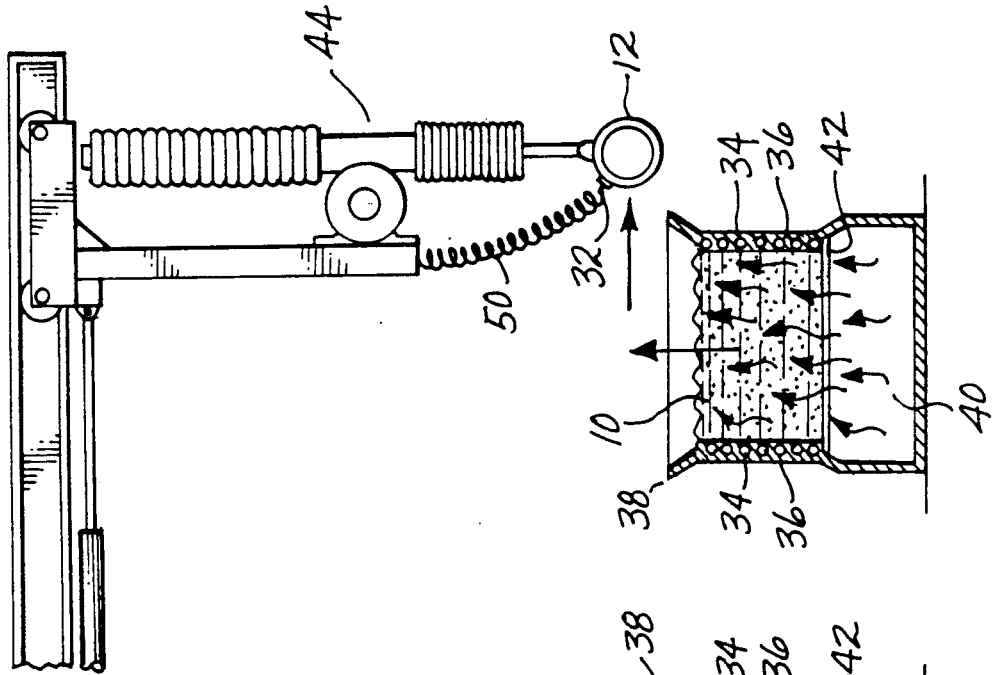
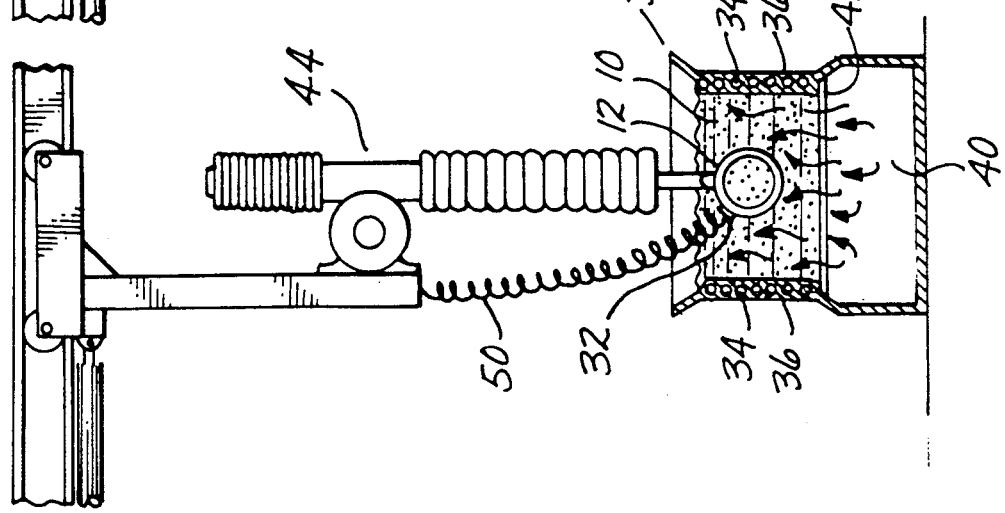

METHOD OF CURING COMPOSITE PARTS

DESCRIPTION

1. Technical Field

This invention relates to a method of curing fiber-reinforced resin matrix composite materials, and particularly to such a method which includes curing parts made from such materials in a heated fluid bath.

2. Background Art

Composite materials comprised of a fiber-reinforced resin matrix are often used to form lightweight, high strength parts. One ideal use of these materials is for fabrication of structural or non-structural aircraft parts. These composite materials use resin matrices formed of polyesters, bismaleimides, polyimides, epoxies, phenolics or other themoplastic and thermoset polymeric substances reinforced with fibers of graphite, glass, ceramic, aramid, boron, sapphire, or the like.

In an uncured or semi-cured state, these materials are relatively flexible. Typically, parts are formed by providing a rigid form onto which the composite material is "built up" or layered into a desired shape. The composite materials may be built up by alternating layers of resins and fibrous sheets, or by applying layers of resin-impregnated fibrous sheets. The fibrous sheets may be either woven or nonwoven from continuous or discontinuous fibers.

After being laid up on a form, the composite materials are cured by subjecting them to a combination of heat and pressure. Upon being heated, the resinous material initially becomes more fluid (less viscous) and flows to homogeniously surround the reinforcing fibers. Compression of the composite materials as they are curing forces out any gas bubbles which may exist in the material which could create structural flaws. The combination of heat and pressure tacilitates crosslinking of the resinous compounds to create a strong, consolidated material.

In the case of thermoplastic materials, the flow and subsequent hardening is the result of a change in phase of the materials and may be repeated by the heating and cooling thereof, as desired. In the case of thermoset materials, the resins will begin to flow initially upon being heated and then, through a chemical reaction, which may include the driving off of volatiles, the resins will begin to harden. Continued heating of the composite materials causes the resins to further harden. In some cases, it is possible to repeat this softening and hardening process with thermoset materials, although the resins exhibit progressively less flow and become progressively harder each time, until a maximum cure state is reached.

Previously, this curing process has been performed commercially by placing a number of uncured parts positioned on forms into a convection oven or autoclave. The oven is loaded cold, heated to a preselected cure temperature, and then cooled or vented prior to removal of the parts. The "heat up" period of an oven or autoclave is necessarily slow and convection-type transfer of heat to the composite parts is also necessarily slow. Such "batch" type processing subjects all parts to the same cure temperature for the same amount of time. Parts of different size, configuration, and/or composition often require different cure temperatures or times. Normally, batches are selected to include parts of similar sizes, shapes and compositions so that each batch will fill an oven as completely as possible and will be cured at approximately the optimum temperature and time. As a result, some parts may be set aside while waiting for other similar parts to complete a batch or, if urgently needed, a less than full batch must be processed.

The strength of cured composite parts depends largely on the degree of crosslinking which occurs between resin molecules. The degree of crosslinking of resin molecules within the composite material is directly related to the extent of resin flow prior to hardening of the resin. The extent to which resin will flow depends upon the composite material being rapidly heated to maximum temperature, thereby reducing resin viscocity to the greatest possible extent, prior to the subsequent resin-hardening portion of the cure cycle.

Compressive pressure is often provided to the composite materials during the curing process by enclosing each part within a substantially sealed bag on which a vacuum is drawn. The reduced pressure within the vacuum bag causes external atmospheric pressure to compress the composite material against the rigid form. Further external compressive pressure may be provided by an autoclave.

A pinhole leak in a vacuum bag during the curing process will often cause a portion of the part to be burned. The vacuum will rapidly draw hot air or ambient atmosphere into the bag against a localized area of the composite material. Such burns may result in the part being defective and, therefore, unusable.

SUMMARY OF THE INVENTION

The present invention provides a method for curing fiber-reinforced resin matrix composite materials which eliminates the above-described problems. According to the present method, uncured composite material is positioned on a form substantially into a desired shape. The composite material is cured by immersing the positioned composite material on the form into a fluid bath which has been heated to a predetermined cure temperature. The composite material is immersed for a predetermined time which is sufficient to allow the composite material to become cured and the composite material is heated at a rate sufficient to provide resin flow prior to curing of the composite material. While the composite material is in the fluid bath, it is provided with compressive pressure.

The invention may be practiced by using a conveyor to move the positioned composite material on the form through a fluid bath which is contained within a U-tube. The U-tube has first and second open ends and the conveyor moves the positioned composite material along a path from the first end to the second end. The conveyor moves at a predetermined rate to allow the composite material to be immersed in the fluid bath for a predetermined time which is sufficient to allow the composite material to become cured. The composite material is heated at a rate sufficient to provide resin flow prior to its becoming cured.

A fluid bath, comprising either a liquid, such as a molten metal, or fluidized particulate material, provides even, fast, and efficient heat transfer by liquid convection, rather than gaseous convection. This facilitates rapid heating of the composite material, allowing resins to begin to flow more quickly and to a greater extent prior to hardening of the resins.

When the present invention is practiced using an open fluid bath, composite parts may be individually immersed into the fluid bath for a period of time determined by the size, shape and composition of the particular part. This curing process does not require "batch" processing nor "heat-up" or "cool down" periods.

According to another aspect of the invention, distinct temperature regions may be defined within the fluid bath so that different parts may simultaneously be cured at different cure temperatures or that a single part may be partially cured at one temperature in one region of the fluid bath and then moved to a second region of the bath to be cured at a second temperature.

Because the heat transfer is rapid, the viscocity of the resin decreases rapidly, providing extensive resin flow. Resins flow not only to a greater extent than when heated by slower methods but at an earlier stage of the cure cycle, before the resins begin to harden. Also due to rapid heat transfer, the time required to cure a composite part is significantly reduced.

A fluid medium may be selected which is inert to and will not damage or contaminate the composite materials when they are immersed therein. If necessary, the positioned composite material may be enclosed within a substantially sealed, flexible bag prior to immersion into the fluid bath to prevent damage to or contamination of the composite material. Compressive pressure may be exerted on the composite material while it is in the fluid bath either by drawing a vacuum on the protective bag and/or by the hydrostatic pressure of the fluid bath. The fluid's hydrostatic pressure may be used to supplement the vacuum pressure or, if the bath is selected to be of sufficient depth, may be used as the primary source of compressive pressure. A fluid bath may be provided which includes a vertical hydrostatic pressure gradient such that the hydrostatic pressure increases as the depth and density of the fluid bath increases. The composite part being cured may be moved to depths corresponding to predetermined hydrostatic pressure during predetermined portions of the cure cycle. In the embodiment which includes the use of a U-tube and conveyor for moving the positioned composite material therethrough, the conveyor's path may be selected to include positions of predetermined hydrostatic pressure, temperature, and duration.

Typically, the composite material and form on which it is positioned will be of a specific gravity less than that of the fluid bath and, therefore, will float in the fluid bath. Another feature of the present invention provides that the positioned composite material is supported by an arm for immersion into and removal from the fluid bath. The arm will hold the composite material and form in an immersed position for a predetermined time at one or more predetermined locations. In the U-tube embodiment, the positioned composite material and form will be supported and carried by the conveyor.

Other novel features and aspects of this invention will become apparent by examination of the drawings, description of the best mode, and appended claims.

BRIEF DESCRIPTION OF THE DRAWINGS

Like reference numerals are used throughout the various figures of the drawing wherein:

FIG. 2 is a partially cut away pictorial view of a composite part prepared for curing according to the preferred method of the invention;

FIG. 3 is a fragmentary sectional view taken substantially along lines 3—3 of FIG. 2;

FIG. 5 is a side sectional view of an open fluid bath showing a support arm holding a composite part in an immersed position;

FIG. 6 is a side sectional view of an open fluid bath showing a support arm holding a composite part in a withdrawn position; and FIG. 7 is a schematic cross-sectional view of a U-tube embodiment according to an alternative method of the invention.

BEST MODE FOR CARRYING OUT THE INVENTION

Figure 1:
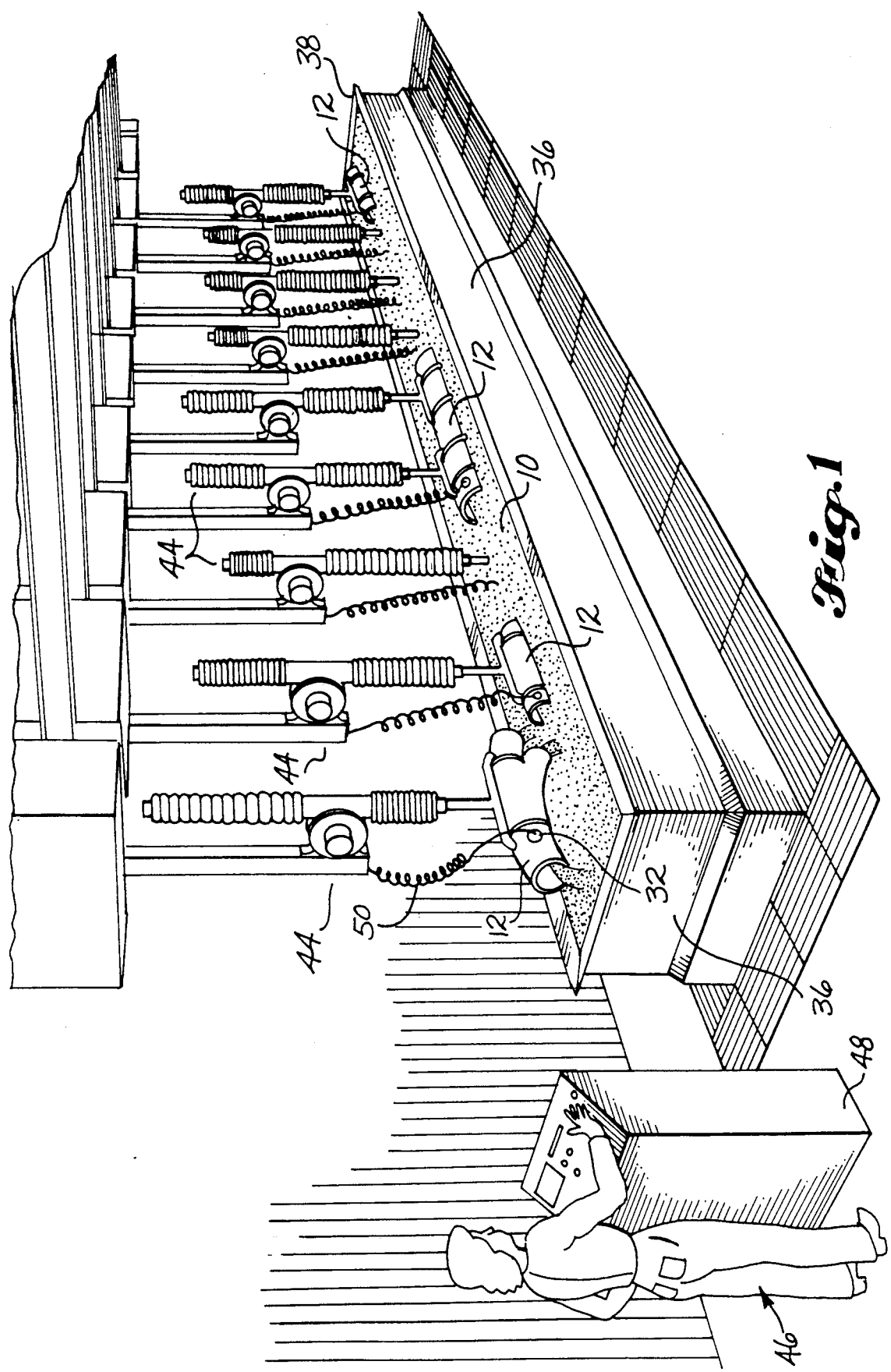
FIG. 1 is a pictorial view of the preferred method of carrying out the invention in an open bath.

Shown in FIG. 1 is a typical, and therefore nonlimitive, example of an open fluid bath 10 in which parts 12 made of composite materials may be cured according to the first preferred method of the invention. Shown in FIG. 2 is a cutaway view of a part 12 made of composite material prepared in the preferred manner for curing according to the invention.

The part 12 is prepared for curing by providing a form 14 having a surface 16 which substantially corresponds in shape to a surface of the desired composite part. According to the present best known mode of practicing the invention, the form 14 or "tool" is made of a thermally damping or substantially insulating material such as plaster. In the case of forming a tubular part, such as that shown in FIG. 2, the form 14 is prepared to have a substantially smooth exterior surface 16. The exterior surface 16 is coated with a releasing lacquer 18 to seal the somewhat porous plaster material. The lacquered surface of the form 14 is then sprayed lightly with silicone 20 to further enhance the non-stick properties of the form 14.

After the form is appropriately prepared, composite material 22 is "built-up" or layered onto the form into a desired shape of desired thickness. The composite materials 22 are comprised of a fiber-reinforced resin matrix, many varieties of which are well known. The composite materials 22 may be built up by applying layers of resin-impregnated fibrous sheets or tape. Alternatively, alternating layers of resins and fibrous sheets may be applied. In a substantially uncured state, the resin/fiber material is relatively flexible and may be easily shaped to a form 14.

In order to aid in evenly applying compressive pressure to the composite materials 22, the materials 22 are then covered with a teflon film 24. Such film 24 is readily available and is substantially inert to the composite materials 22 and, therefore, resistant to sticking or bonding to them. Over the teflon film 24 is applied overlapped layers of heat-activated shrink tape 26 of any well known composition. This shrink tape 26 is activated by the heat of curing the part 12 and aids in evenly compressing the composite material 22. The part 12 is covered with a gas-permeable "breather" material or pad 28 and then completely enclosed within a sealed, flexible vacuum bag 30. A vacuum is drawn on the bag 30 by evacuating the bag 30 through a vacuum probe 32 in a well known manner. The ambient pressure, then being many times that of the pressure inside the vacuum bag 30, compresses the composite material 22 against the form 14. The breather material 28 aids in providing even pressure transfer so that effects of any wrinkles in the vacuum bag 30 will not appear in the finished part.

According to the open bath method of curing the prepared composite part 12, a fluid bath 10 is provided and heated to a predetermined temperature. This temperature corresponds to the optimum cure temperature for the particular resin being used in the composite material 22. Cure temperatures range from 250° to 800° F. (120° to 425° C.) for thermoplastic and thermosetting resins. The fluid bath 10 may comprise a molten eutectic metal or alloy having a melting temperature below that of the desired cure temperature. Alternatively, the fluid bath 10 may comprise a fluidized bed of particulate solid material such as sand or beads of aluminum oxide or glass.

A fluidized bed causes relatively small particles of a solid to flow in a manner normally characteristic of a liquid. A bed of solid discreet particles is subjected to an upward gaseous current, the size and weight of the particles and the velocity and nature of the current being so chosen that the force exerted by the current is sufficient to counterbalance the gravitational force on the free particles and to expand the bed, thus allowing movement of the particles, but is insufficient to convert the whole bed into a uni-directional stream of particles. The movement of the particles in the bed may be random or may include movements analagous to convection or circulatory flow in a liquid. For example, localized upward movement of particles may occur in a zone or zones of the bed and localized downward movement of particles may occur in another zone or other zones of the bed. As will be further discussed below, the flow may be controlled to substantially segregate areas from intermixture so that separate temperature zones may be defined.

The bath 10, whether comprising molten metal or a fluidized solid, may be heated by coils 34 positioned in or adjacent to side panels 36 or the bottom of the fluid bed container 38. In the case of a fluidized bed, the fluidizing gas may also be heated.

According to the method of the present invention, uncured composite material 22 positioned on its form 14 is immersed for a preselected time into a fluid bath 10 that has been heated to a preselected temperature. The fluid, whether in the form of a molten metal or fluidized solid, rapidly conducts heat to the composite material 22 to begin the curing process. The conduction of heat is so rapid that, normally, a thermally damping or insulating form 14 must be used. The use of a highly conductive form, such as one made of metal, can cause foaming of the resin to occur. A form 14 made of a thermally damping material, such as plaster, allows rapid, but controlled, curing of the composite material 22.

A metal having an appropriately low melting point may be selected as the fluid bath substrate. Preferably, the metal will be relatively inert to the composite material or any of the other materials associated with the prepared composite part. In this case, an outer protective bag and pressure-dispersing breather pad will be unnecessary, unless vacuum pressure is required, as the molten metal will completely surround the composite part tool exerting equal contact and pressure at all points. Likewise, a relatively inert and non-abrasive solid particle substrate is preferably selected for use in a fluidized bed version of the method. If deemed necessary to protect the prepared composite part 12 from either direct contact with molten metal or fluidized particles, the part 12 may be enclosed within a protective, flexible bag 30. The bag 30 will not diminish the effect of pressure and heat transfer from the fluid bath 10 to the prepared composite part 12. In some instances, a problem of oxidation or burning of portions of the composite material may occur if it is overheated, too rapidly heated, or if the resin is one which has a tendency to oxidize as it is being cured. This problem will be eliminated in the case of a molten metal bath as insufficient oxygen will be present to allow this reaction. Likewise, in the case of a fluidized bed, an oxygen-binding or inert gas, e.g. nitrogen, may be used as the fluidizing gas, therefore substantially eliminating the presence of oxygen from the fluid bath 10. If desired, the fluidizing gas may be collected from above the bath 10 and recirculated.

An objective in curing composite material is to create a substantially homogeneous, consolidated resin matrix surrounding reinforcing fibers. Upon initial heating of the resin, it becomes less viscous and begins to flow. Continued heating will cause thermosetting resins to harden as volatiles are driven off. In order to achieve maximum resin flow, and therefore maximum crosslinking of resin molecules, it is necessary to rapidly heat the composite material to optimum temperature prior to hardening of the thermosetting resins. If the material is heated too slowly, or to a too low temperature, the resin will not sufficiently flow and crosslink prior to its hardening. This results in a less homogeneous and inadequately consolidated composite part.

Figure 4:
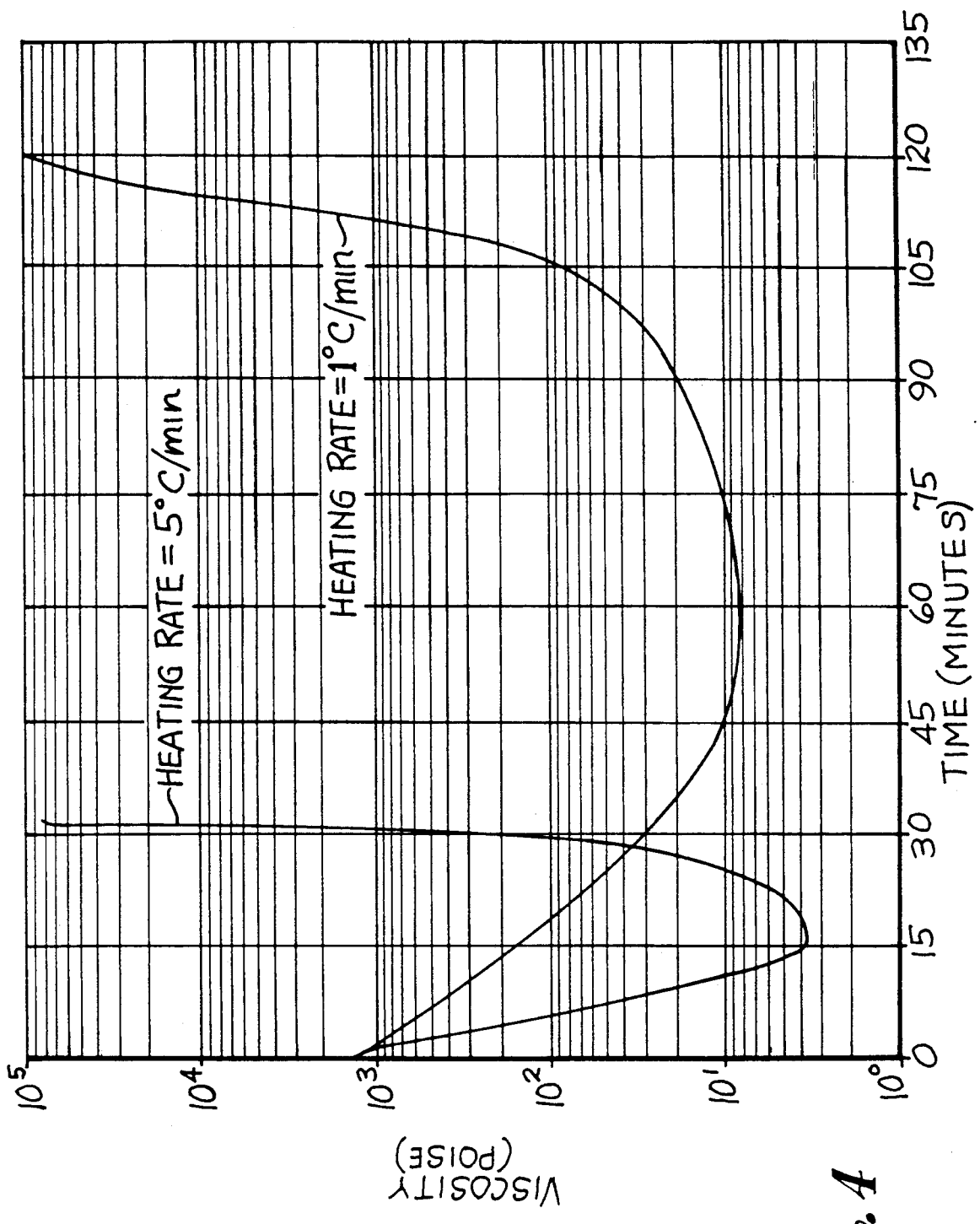
FIG. 4 is a graph representing the relative viscocity of a typical composite material resin heated at a rate of either 5° C. or 1° C. per minute during a typical cure cycle.

Referring to FIG. 4, therein is shown a graph illustrating comparative cure cycles characteristic of thermosetting resins such as polyesters, phenolics, epoxies, bismaleimides and polyimides. The horizontal axis of the graph shows, in logarithmic scale, viscosity in units of Poise (centimeter-gram-second unit of viscosity). The horizontal axis represents the duration of the cure cycle in minutes. The broadly curved line represents the change in viscosity over a typical cure cycle of a thermosetting resin heated at a rate of 1° C. per minute. The lowest point of the graph represents the maximum flow (lowest viscosity) of the resin and occurs at approximately 55 minutes into the cure cycle. The resin heated at this rate will substantially reach its hardest (most viscous) state after approximately 120 minutes.

The steeply curved line represents the change in viscosity of the same thermosetting resin heated at a rate of 5° C. per minute. Heated at this rate, the resin achieves its maximum flow state at approximately 15 minutes and its maximum cure state at approximately 35 minutes. This curve reflects a logarithmic reduction in viscosity of at least fifty percent due to the increased heating rate.

Processing time in an autoclave or convection oven for typical composite parts may be six or more hours. Much of this cycle time is due to the required heating up and cooling down periods. Loading parts onto a rack and into an oven or autoclave in order to maximize the capacity of each batch is a lengthy and laborious process. Due to the high pressures at which autoclaves operate, regular maintenance, testing and certification is required to assure safe operation.

The time required for curing composite parts in a fluid bath according to the present method can reduce curing cycle time to as little as one-fifth that of conventional methods. The bath 10 can be maintained at a constant desired temperature, eliminating energy- and time-consuming heat-up and cool down periods. Prepared composite parts 12 may be independently immersed into the fluid bath 10 for individual preselected times, therefore assuring optimum cure for parts 12 of any size, shape or composition. The rapid conduction transfer of heat to the composite part 12 greatly shortens the actual cure time of the composite materials and facilitates more extensive resin flow prior to hardening.

Placing compressive pressure on the composite material 22 as it is cured further promotes consolidation and crosslinking of resin molecules. The compressive pressure also squeezes out air bubbles from the composite material 22 which could otherwise cause structural defects. While being cured according to the method of the present invention, compressive pressure may be applied by the well-known method of vacuum bagging 30 each prepared composite part 12. As previously described, if a pinhole leak develops in such a vacuum bag as a composite part is being cured in an oven or autoclave, the rush of heated air into the bag can cause localized oxidation or burning of the composite material. When the prepared part 12 is immersed in a fluid bath, the relatively dense surrounding material will not be drawn into a pinhole leak in the vacuum bag 30. Also, as previously described, oxygen may be substantially excluded from the fluid bath 10.

According to another feature of the present invention, compressive pressure may be applied to the prepared composite part 12 by selecting a fluid bath 10 of sufficient depth such that the fluid applies hydrostatic compressive pressure on the part 12 evenly in three axes. The hydrostatic pressure of the fluid bath 10 depends upon the specific gravity of the fluid selected and depth to which the prepared part 12 is immersed The hydrostatic pressure of the fluid bath 10 will vary from insignificant, near the surface of the bath 10, to maximum, at the bath's deepest point. This pressure gradient may be used advantageously by positioning the prepared composite part 12 at one or more preselected depths, and therefore pressures, during the cure cycle. Likewise, parts 12 of different sizes, shapes and compositions may be cured at different preselected pressures. Normally, the pressure gradient which occurs between the uppermost and lowermost points of a single part is considered insignificant. However, by selecting a bath 10 of sufficient depth or density (specific gravity), the hydrostatic pressure will provide or supplement the compressive pressure on the part 12.

In order to reduce the volume of molten metal required to provide a desired hydrostatic pressure near a lower portion of the bath 10, the level of the bath 10 may be artificially raised by displacing a significant volume of an upper portion of the bath 10 with a displacement mass. The mass would substitute for and displace a volume of the fluid, thereby artificially increasing the effective depth of the fluid bath.

Zones of different preselected temperatures may be defined within the fluid bath 10. The heating coils 34 of the fluid bath housing 38 may be positioned to selectively heat regions of the fluid bath 10. When used with a fluidized bed, the flow of particles may be controlled to limit intermixing of heated particles between selected zones or regions of the fluid bath 10. In the example of the present method which uses a fluid bath 10 comprising a molten metal, thermoclines which horizontally separate temperature zones may be created by selected zone heating or by circulatory restriction. A thermocline is a level or layer of the fluid bath 10 at which the temperature gradient is greater than that of either the layer thereabove or therebelow. This may be created by zone heating and limiting of circulatory flow.

Referring now to FIGS. 1, 5 and 6, therein is shown an example of an open fluid bath 10 for use according to a preferred method of the present invention The fluid bath 10 is held in an elongated housing 38 and a plurality of prepared composite parts 12 may be independently immersed and withdrawn from the bath 10. The bath 10 may comprise a molten metal or, as shown in FIGS. 5 and 6, be a fluidized bed of solid particles. Such fluidized beds are well known in operation and construction and generally comprise a fluidizing gas supply duct 40 disposed beneath a porous screen or floor 42. When not fluidized by pressurized gas, the particulate material will settle and be supported on the screen 42 which is selected to be readily permeable to the fluidizing gas but to exclude the solid particles. When fluidized, the solid particles will act as a bath characteristic of a liquid such that a prepared part 12 may easily be immersed therein. For this reason, it is not necessary to batch load prepared composite parts 12 as would be required with an unfluidized bed of sand or other solid particles. A mechanical arm 44 may be used to immerse the prepared part 12 and hold it in position during the curing cycle. The support arm 44 may take on any of a variety of forms including a rack and pinion, hydraulic cylinder, or other form of robotic movement. Movement of the support arms 44, as well as temperature and pressure regulation, may be controlled by an operator 46 at a remote panel 48.

FIG. 1 shows a number of prepared composite parts 12 in a variety of immersed, removed, and partially-immersed positions. The illustrated parts 12 are generally tubular in form, although the process may be used for parts 12 of any size or shape limited only by the capacity of the fluid bath 10. The present process is particularly advantageous for curing of tubular parts 12 in that the heated fluid is able to flow within the form or tool 14 to completely surround the prepared part 12.

FIG. 5 shows a prepared part 12 in an immersed position and with a vacuum probe 32 and line 50. The vacuum line 50 may be conveniently carried by the support arm 44. FIG. 6 shows the support arm 44 in a retracted position with the prepared part 12 removed from the bath 10. In the illustrated form, compressive pressure is supplied by vacuum bagging 30 of the part 12 with supplemental pressure (of approximately 20 psi) added by the fluid bath 10. As previously described, if the fluid bath 10 is provided in sufficient depth, the vacuum line 50, probe 32, and bag 30 may be eliminated.

Referring now to FIG. 7, therein is shown schematically an apparatus for use in an alternate preferred method of the invention. According to this method, a fluid bath 10' in the form of either a fluidized bed of solid particles or a molten metal is provided within a U-tube 52 having opposite open ends 54, 56. Uncured prepared parts 58 are carried by a conveyor 60 into the first open end 54 of the U-tube 52. In general, the hydrostatic pressure placed on the uncured part 58 by the fluid bath 10' will increase as the part 58 descends into the U-tube 52. Maximum compressive pressure will occur at the lowest point 62 of the conveyor's path. During ascent toward the second open end 56 of the U-tube 52, hydrostatic pressure will gradually decrease. Cured composite parts 64 may be removed from the conveyor 60 as they emerge from the second open end 56 of the U-tube 52.

The speed of the conveyor 60 is selected to subject the uncured parts 58 to sufficient temperature and pressure for a preselected amount of time. When using independently-controlled heaters 66, 68, 70, zones of various preselected temperatures may be defined within the bath 10'. The temperature zones may be selected to coincide with the hydrostatic pressure being exerted on an uncured part 58 so as to facilitate maximum resin flow prior to hardening, thereby producing optimum consolidation of the composite material 22.

The illustrative, and therefore nonlimitive, apparatus shown in FIG. 7 may be altered in a variety of aspects without departing from the scope of the present invention. For example, the U-tube 52 and/or fluid level 72 may be provided with increased or decreased heighth in order to create a preselected maximum hydrostatic pressure at its lowermost region 62. The lowermost portion 62 may be lengthened so that the path of, the conveyor 60 will be located in this maximum hydrostatic pressure region for a longer period of time. Also, the generally U-shaped tube 52 may include other bends to provide plateaus at preselected pressure or temperature regions.

Many other variations may be made to the above-described methods and equipment used in conjunction with these methods without departing from the spirit and scope of the present invention. Therefore, patent protection is not to be limited by the above descriptions of preferred modes for practicing the invention or by the illustrated equipment, but rather by the following appended claim or claims as interpreted by accepted doctrines of claim interpretation, including the doctrine of equivalents.

What is claimed is:

1. A method of curing fiber reinforced resin matrix composite materials, comprising the steps of:
   providing a form;
   positioning uncured composite material on said form substantially into a desired shape; and
   curing said composite material by:
      providing a fluid bath heated to a predetermined temperature in a U-tube, said U-tube having first and second open ends;
      providing a conveyor and using said conveyor to move said positioned composite material on said form through said fluid bath along a path from said first end to said second end, said conveyor moving at a predetermined rate to allow said positioned composite material on said form to be immersed in said fluid bath for a predetermined time;
      said predetermined time being sufficient to allow said composite material to become cured, and said composite material being heated at a rate sufficient to provide resin flow prior to said composite material becoming cured; and
      providing compressive pressure on said composite material while in said fluid bath.

2. The method of claim 1, wherein said fluid bath comprises a liquid.

3. The method of claim 1, wherein said fluid bath comprises fluidized particulate material.

4. The method of claim 1, wherein said compressive pressure comprises hydrostatic pressure of said fluid bath.

5. The method of claim 1, wherein said positioned composite material is enclosed within a substantially sealed, flexible bag prior to immersion into said fluid bath to prevent damage to said positioned material by said fluid bath.

6. The method of claim 4, wherein said fluid bath includes a vertical hydrostatic pressure gradient, said hydrostatic pressure increasing as the depth of said fluid bath increases, and wherein said path includes positions of predetermined hydrostatic pressure along said gradient through which said positioned composite material is moved by said conveyor.

7. The method of claim 1, wherein said fluid bath includes a thermocline on one side of which is a first region heated to a first predetermined temperature and on the other side of which is a second region heated to a second predetermined temperature, and the step of heating further comprises first immersing said positioned composite material on said form in one of said regions and then immersing said positioned composite material on said form in the other of said regions.

8. The method of claim 1, wherein said form comprises a thermally damping material.

9. The method of claim 1, wherein said form is configured to support said composite material in a tubular shape.

10. The method of claim 8, wherein said form is configured to support said composite material in a tubular shape.

11. A method of curing fiber reinforce resin matrix composite materials, comprising the steps of:
   providing a form;
   positioning uncured composite material on said form substantially into a desired shape; and
   curing said composite material by:
      providing a fluid bath heated substantially to a predetermined cure temperature;
      heating said composite material by submersing said positioned composite material on said form into said fluid bath for a predetermined time, said predetermined time being sufficient to allow said composite material to become cured, and said composite material being heated at a rate sufficient to provide resin flow prior to said composite material becoming cured; and
      providing compressive pressure on said composite material while in said fluid bath.

12. The method of claim 11, wherein said fluid bath comprises a liquid.

13. The method of claim 11, wherein said fluid bath comprises fluidized particulate material.

14. The method of claim 11, which further comprises enclosing said positioned composite material within a flexible bag before submersing said material, and in which providing said compressive pressure includes drawing a vacuum on said bag.

15. The method of claim 14, wherein said uncured composite material is positioned on said form by layering multiple plies of resin-impregnated fibrous sheets.

16. The method of claim 11, wherein said fluid bath comprises material of sufficient density such that said compressive pressure comprises hydrostatic pressure of said fluid bath.

17. The method of claim 11, wherein said positioned composite material is enclosed within a substantially sealed, flexible bag prior to submersion into said fluid bath to prevent damage to said positioned material by said fluid bath.

18. The method of claim 16, wherein said fluid bath includes a vertical hydrostatic pressure gradient, said hydrostatic pressure increasing as the depth of said fluid bath increases, and wherein said step of submersing includes submersing said positioned composite material to a preselected depth, thereby providing a preselected hydrostatic compressive pressure on said positioned composite material.

19. The method of claim 11, wherein said uncured composite material is positioned on said form by layering multiple plies of resin impregnated fibrous sheets.

20. The method of claim 11, wherein said positioned composite material on said form is supported by an arm for submersion into and removal from said fluid bath, said arm holding said composite material and said form in an submersed position during said predetermined time.

21. The method of claim 11, wherein said fluid bath includes a thermocline on one side of which is a first region heated to a first predetermined temperature and on the other side of which is a second region heated to a second predetermined temperature, and the step of heating further comprises first submersing said positioned composite material on said form in one of said regions and then submersing said positioned composite material on said form in the other of said regions.

22. The method of claim 21, wherein said positioned composite material on said form is supported by an arm for submersion into and removal from said fluid bath, said arm holding said composite material and said form in an immersed position during said predetermined time.

23. The method of claim 11, wherein said form comprises a material having sufficient thermal damping qualities to prevent rapid transfer of heat through said form.

24. The method of claim 11, wherein said form is configured to support said composite material in a tubular shape.

25. The method of claim 23, wherein said form is configured to support said composite material in a tubular shape.

* * * * *